(12) United States Patent
Hu (10) Patent No.: US 11,137,986 B2
(45) Date of Patent: Oct. 5, 2021

(54) SIMILAR CODE ANALYSIS AND TEMPLATE INDUCTION

(71) Applicant: SAP SE, Walldorf (DE)

(72) Inventor: Dongqing Hu, Shanghai (CN)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 16/714,007

(22) Filed: Dec. 13, 2019

(65) Prior Publication Data

US 2021/0182037 A1 Jun. 17, 2021

(51) Int. Cl.
G06F 9/44 (2018.01)
G06F 8/41 (2018.01)
G06F 8/75 (2018.01)

(52) U.S. Cl.
CPC .............. *G06F 8/427* (2013.01); *G06F 8/751* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 8,745,027 B1 * | 6/2014 | Haustein | ............... | G06F 40/186 707/708 |
| 10,809,983 B1 * | 10/2020 | Reas | ......................... | G06F 8/33 |
| 2015/0154011 A1 * | 6/2015 | Ceng | ........................ | G06F 8/51 717/137 |
| 2018/0373986 A1 * | 12/2018 | Rainwater | ............... | G06F 11/36 |
| 2020/0218535 A1 * | 7/2020 | Alomari | .............. | G06F 16/9027 |

OTHER PUBLICATIONS

Xiong, Y., "Patl: Safe Program Transformation between APIs with Many-to-Many Mappings," Hangzhou Research Lab, Huawei Co., Zhejiang, China, 28 pages, Apr. 2016.

* cited by examiner

*Primary Examiner* — Jae U Jeon
(74) *Attorney, Agent, or Firm* — Sterne, Kessler, Goldstein & Fox P.L.L.C.

(57) ABSTRACT

Disclosed herein are system, method, and computer program product embodiments for mitigating similar and/or duplicate data. An embodiment operates by a computing device receiving a first and second code segment and parsing the first and second code segments into a first and second abstract syntax tree (AST), respectively. Thereafter, the computing device generates a first and a second normalized. AST corresponding to the first and second ASTs, respectively, based on a normalization rule such that the first and second normalized ASTs correspond to a first and second normalized code segment. The computing device then derives analytical information of the first and second normalized ASTs based on the first and second normalized code segments.

20 Claims, 10 Drawing Sheets

SIMILAR CODE ANALYSIS AND TEMPLATE INDUCTION

BACKGROUND

Current software systems may contain software having significant lines of code (e.g., millions of lines of code). As a result, the total cost of ownership for maintaining and developing software has grown considerably, especially considering that software may be continually updated with new lines of code. Accordingly, prior systems have attempted to lower the cost of ownership by reducing duplicate or similar lines of code (e.g., code with or without subtle differences). However, prior systems may be unable to navigate inconsistent logic in software systems to identify duplicate or similar code. Likewise, prior systems may be unable to accurately and efficiently identify similar lines of code in large software systems.

BRIEF DESCRIPTION OF THE DRAWINGS

The accompanying drawings are incorporated herein and form a part of e specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for mitigating similar and duplicate data. In some embodiments, systems utilize a server and an analyzing device. The server stores hundreds or thousands of code segments for various computer programs. As such, in some embodiments, for mitigating similar data, the analyzing device includes a recognizer, an indexer, a searcher, an analyzer, and/or a database.

The recognizer includes a parser, a normalizer, a measurer, and a comparer. Upon receiving two code segments, the parser parses each code segment into an abstract syntax tree (AST). The normalizer then normalizes the ASTs to a dedicated form based on one or more normalization rules, thereby creating normalized ASTs. The measurer measures the normalized ASTs and confirms that they meet or exceed a predetermined quality threshold. The comparer then compares the normalized ASTs to determine if match and may be stored in a single location.

The indexer includes a parser, a normalizer, a measurer, a hasher, and a saver. In some embodiments, the indexer utilizes the recognizer's parser, normalizer, and measurer. As such, the indexer's hasher may generate a hash code based on the normalized AST. Accordingly, if normalizing two different code segments results in matching normalized ASTs, the hash code for each will be the same. The indexer's saver saves the normalized AST in an appropriate location in a hash-based location of the analyzing device's database.

The searcher includes a parser, a normalizer, a measurer, a hasher, a comparer, and a finder. In some embodiments, the searcher utilizes the recognizer's parser, normalizer, comparer, and measurer, and the indexer's hasher. As such, the searcher's finder may locate stored normalized ASTs in the hash-based locations of the analyzer's database.

Thus, after processing hundreds or thousands (or more) of different code segments, their resulting normalized AST may be saved in the appropriate hash-based location of the database. As such, although there may be significantly different versions of code segments, the resulting normalized AST may be significantly less, thus saving storage costs. In other words, whereas the different code segments may require storage in many different database locations, the normalized. ASTs requires fewer database locations, for example, by removing unnecessary or insignificant elements of the code segments. For example, whereas multiple different code segments may require storage locations, their normalization may thus require a single storage location since they are similar to each other.

The analyzer derives analytical information based on the saved normalized ASTs. For example, the analyzer may derive a total number of similar code segments, an average number of similar code segments, and/or an overall distribution of similar code segments per storage location, to name just a few examples.

Further, in some embodiments, for mitigating duplicate data, the analyzing device includes an inducer, a modifier, and an applier. The inducer generates a template from two or more code segments and updates the template with every remaining code segment. In doing so, the inducer converts the code segments to ASTs. The inducer then traverses the ASTs, compares each corresponding node, and generates a new or updated AST template.

In comparing corresponding nodes, the inducer determines if the underlying data (e.g., elements of the code segments) are the same or different. If the underlying data of the corresponding AST nodes is the same, the inducer creates a copy of the data for a corresponding node of the new/updated AST template. However, if the underlying data of the corresponding AST nodes are different, the inducer adds a special node "S" to a corresponding AST node location of the new/updated AST template and creates an appropriate tuple associated therewith.

By creating/updating the AST template, argument tuples may result, with some argument tuples occurring repeatedly. Thus, inducer may determine a number of times unique argument tuples occur and sort them by occurrence. Inducer may then select the argument tuples having the greatest number of occurrences and convert those argument tuples to generic parameters.

The modifier permits a user to modify the AST template. For example, the modifier may permit the renaming of the generic parameters. The applier applies actual parameters to the generic parameters to generate new code segments.

Figure 1:
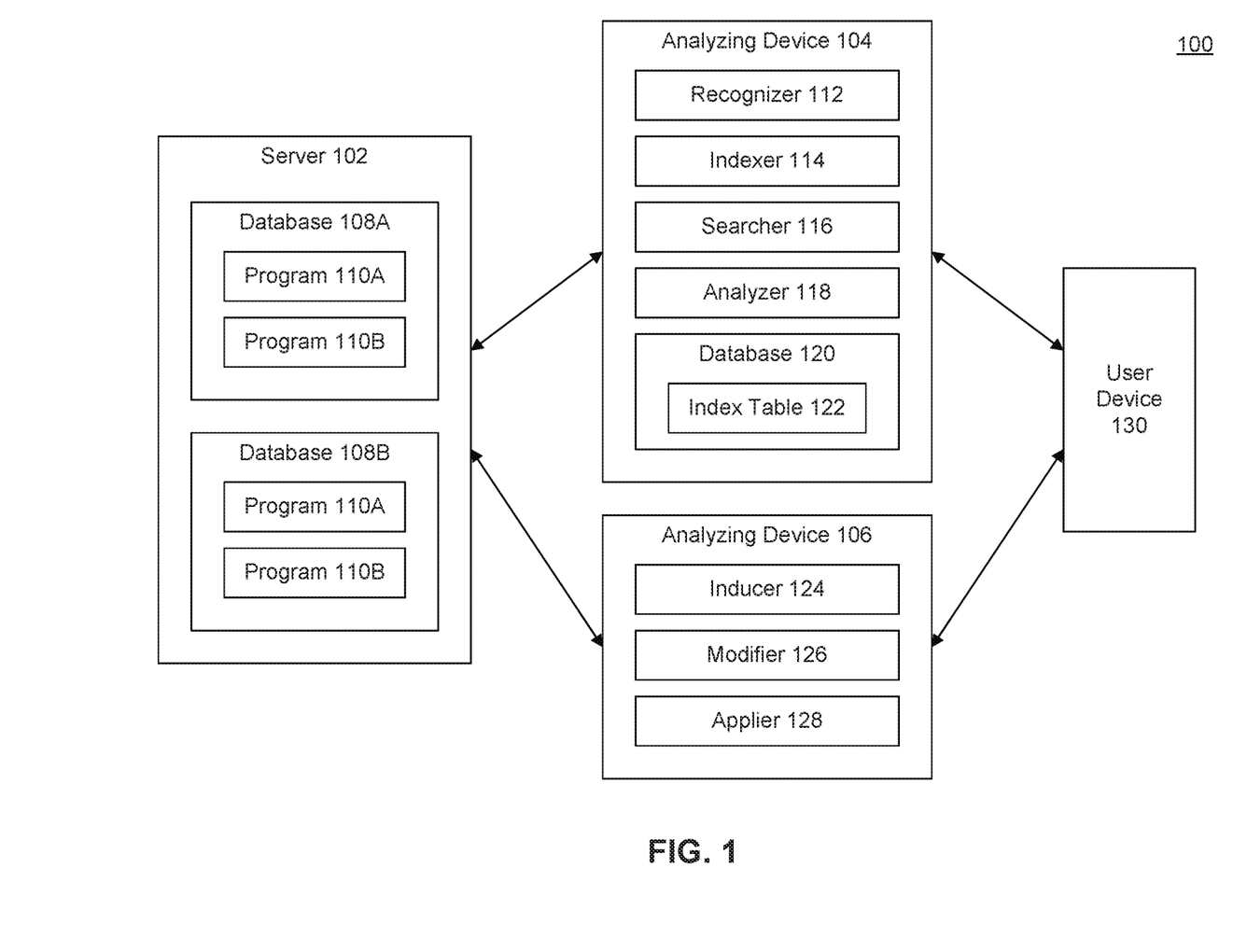
FIG. 1 is a block diagram of an example system for mitigating similar and duplicate data, according to some embodiments.

FIG. 1 illustrates an example system 100 for mitigating similar and duplicate data. System 100 includes server 102, analyzing device 104 or 106, and/or user device 130. Server 102 may include a plurality of databases 108A-B that store programs 110A-B having various lines of code. Databases 108A-B may be stored at a central location or at various locations (e.g., user devices). Along these lines, databases 108A-B may store hundreds or thousands (or more) of lines of code relating to the same or different programs. Accordingly, although the same program may have duplicate and/or similar lines of code, different programs may also have duplicate and/or similar lines of code. Further, the lines of code may be of the same or different programming languages (e.g., C, C++, Java, Pascal, Fortran, Perk PHP, LISP, and Scheme).

Analyzing devices 104 and 106 mitigate duplicate and/or similar data, thereby reducing the cost of server 102's databases 108A-B for storing such data. As such, analyzing devices 104 and 106 are in communication with server 102. User device 130 assists the analyzing devices 104 and 105 in mitigating the similar and duplicate data. Thus, user device 130 is in communication with analyzing devices 104 and 106. Additionally, although not illustrated, user device 130 may be in communication with server 102. Along these lines, analyzing devices 104 and 106 and user devices 130 may be third party devices and may thus be managed by a different or same entity as server 102.

For mitigating similar data, analyzing device 104 comprises recognizer 112, indexer 114, searcher 116, analyzer 118, and/or database 120. As will be discussed in more detail below, each of these primary components may comprise one of the same elementary components. As such, in some embodiments, the primary components may utilize another primary component's elementary component. For example, recognizer 112 may comprise a parser for parsing code segments into ASTs and a normalizer to normalize the ASTs. Indexer 114 may comprise a hasher to generate a hash code of the normalized ASTs. Accordingly, in some embodiments, the indexer 114 may utilize the indexer 114's parser and normalizer in order for the hasher to generate the hash code. By operating in such a fashion, the primary components (i.e., recognizer 112, indexer 114, searcher 116, and/or analyzer 118) may be built upon each other.

Figure 2:
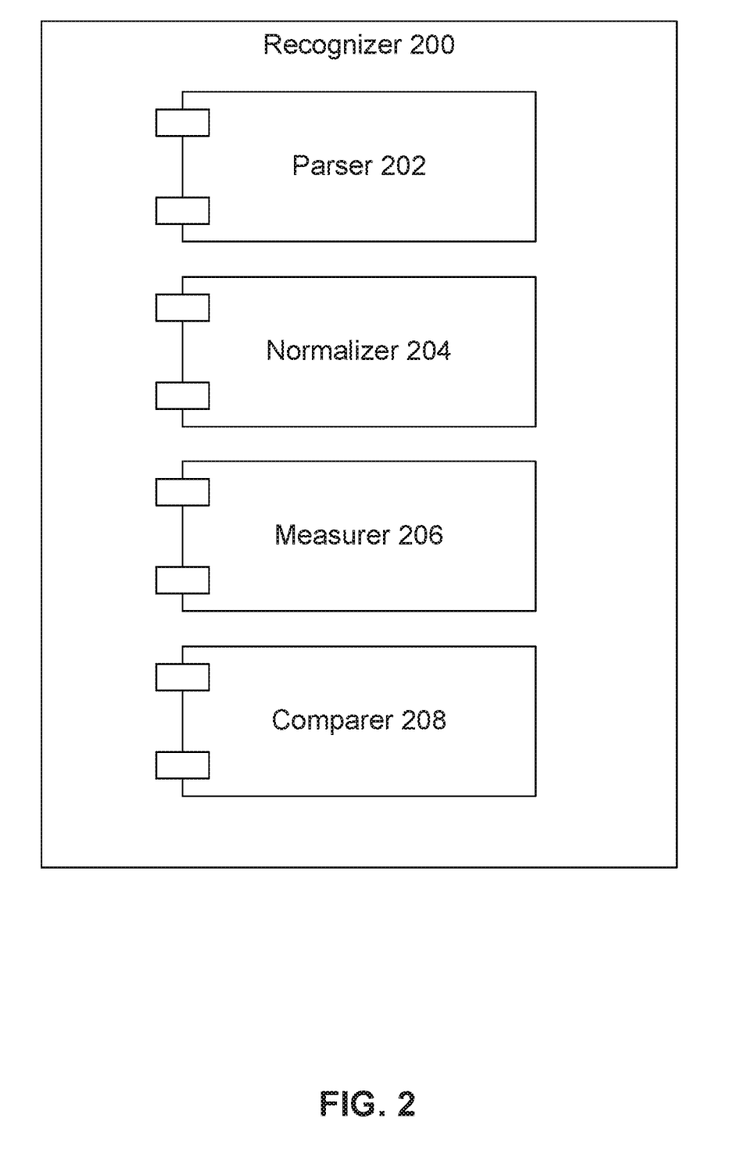
FIG. 2 is an example recognizer of the system of FIG. 1, according to some embodiments.

FIG. 2 illustrates an example of recognizer 200 of analyzing device 104 (of FIG. 1). Recognizer 200 comprises parser 202, normalizer 204, measurer 206, and comparer 208. Parser 202 receives code segments from server 102 (of FIG. 1). In some embodiments, the code segments are provided by a user of device 130 (of FIG. 1). The code segments may also be retrieved by parser 202 or provided by server 102.

Figure 3:
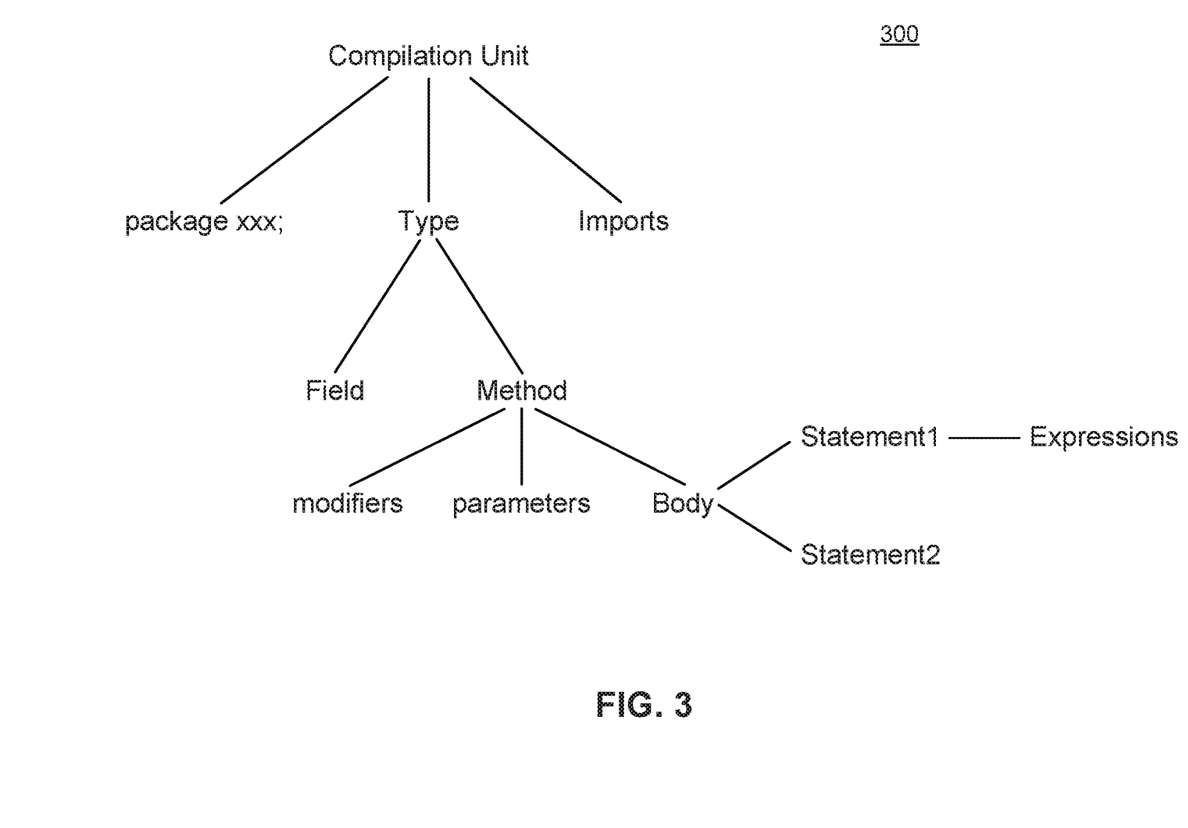
FIGS. 3-5 and 8 are example abstract syntax trees (ASTs) according to some embodiments.

Upon receiving the code segments, parser 202 parses code segments of programs 110A-B into separate Abstract Syntax Trees (ASTs). For example, parser 202 parses code of programs 110A-108B into a first and second AST, respectively. The first and second ASTs comprise nodes, which may be independent or independent. Along these lines, the first and second ASTs may be different and thus comprise different nodes, which may comprise different elements of the programs 110A-B. For example, the nodes of the first AST may be associated with one or more code segments of program 110A. Similarly, the nodes of the second AST may be associated with one or more different code segments of program 110B. FIG. 3 is an example of a generic AST, according to some embodiments.

Normalizer 204 conforms or reduces the code segments of each node to a predefined format. In doing so, normalizer 204 partially or entirely removes or modifies elements of code segments of programs 110A-B (of FIG. 1) corresponding to nodes of ASTs. For example, normalizer 204 may remove unimportant details of the programs 110A-B, such as a logging statement (e.g., log.error("Something wrong!", e)). Thus, after normalization, the resulting form of different code segments are formally equivalent. For example, if code segments "x" and "y" are not equal and normalized by a normalization function is "N," the resulting form of the code segments "N(x)" and "N(y)" would be equal.

In some embodiments, normalizer 204 removes dispensable statements and/or unifies variable names. For example, an original code segment may be:
catch (Exception e) {
    log.error("Something wrong!", e);
    handleException(e);
}, where the variable "e" may be "ex" or "exception" in other codes. As such, normalizer 204 may unify "e" to a predetermined name that does not have any meaning. If the predetermined name is "v1," then all similar code becomes:
catch (Exception v1) {
    log.error("Something wrong!", v1);
    handleException(v1);
}.

Normalizer 204 may remove statements related to business logic (e.g., logging statements). For example, an original code segment may be a logging statement in the form of:
(catch (Exception e) {
    log.error("Something wrong!", e);
    handleException(e);
},
As such, normalizer 204 may identify that the logging statement in the code segment. As such, normalizer 204 may remove the logging statement, and the resulting code segment may be:
(catch (Exception e){
    handleException(e);
}, Normalizer 204 may also associate conditional branches when the variable "i" utilized in "getImportantValue" methods. The conditional branches may specify that the "i" value may only be certain predetermined numbers (e.g., 0 or 1), thus removing data associated with any other "i" value. Accordingly, an original code segment may be:
Integer i=getImportantValue( )
if (i==null) {
    handleNullValue( );
} else if (i==1) {
    handleValue1( );
} else if (i==2) {
    handleValue2( );
} else {
    handleUnexpectedValue( );
}
Thus, after normalizing the conditional branches, the resulting code segment may be:
Integer i=getImportantValue( );
if (i==null) {
    handleNullValue( );
} else if (i==1) {
    handleValue1( );
}
Through normalizing, normalizer 204 applies predetermined rules (e.g., a list of predetermined normalization rules) to the ASTs. The predetermined rules may be custom and/or unique to the entity managing the server 102 and/or analyzing device 104 (of FIG. 1). Each rule may correspond to a different/particular node of the ASTs. Moreover, each rule may be associated with a different unique identifier. As will described in more detail below, the unique identifiers may be utilized to compare nodes of different ASTs.

Along these lines, normalizer 204 may apply different rules from a list of predetermined normalization rules to different ASTs based on the nodes of AST. The resulting ASTs may be considered a modified or normalized ASTs. Along these lines, the resulting ASTs may correspond to the same modified or normalized code segments.

Figure 4:
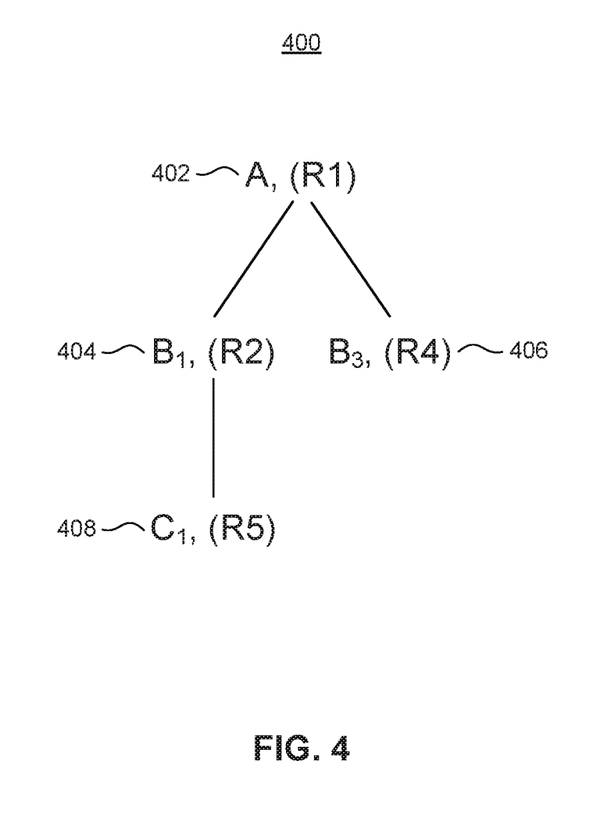
Figure 5:
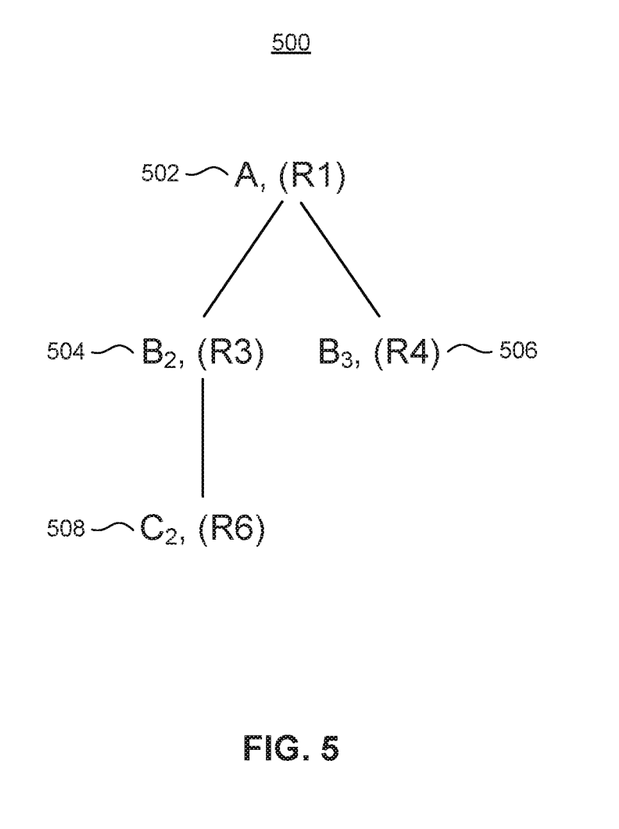

FIGS. 4 and 5 are example ASTs 401) and 500 comprising different nodes. AST 400 includes node "A1" 402, node "B1" 404, node "B3" 406, and node "C1" 408. Like AST 400, AST 500 also includes node "A1" 502 and node "133" 506. However, in addition, AST 500 also includes node "B2" 504 and node "C2" 508. As such, normalizer 204 (of FIG. 2) applies a rule list to ASTs 400 and 500. The rule list may include "R1," "R2," "R3," "R4," and "R5," which correspond to nodes "A1," "B1," "B2," "B3," "C1, and "C2." respectively. As such, for AST 400, normalizer 204 applies rules "R1," "R2," "R4," and "R5" to nodes "A1" 402, "B1" 404, "B3" 406, and "C1" 408, respectively. And, for AST 500, normalizer 204 applies "R1," "R3," "R4," and "R6" to nodes "A1" 502, "B2" 504, "B3" 506, "C2" 508, respectively.

Referring back to FIG. 2, in some embodiments, normalizer 204 may store multiple groups of predetermined rules associated with different degrees of normalization. For example, one group of predetermined rules may attempt to be modestly aggressive (e.g., attempting to modify or remove a predefined number ("X") of elements), another group of predetermined rules may be very aggressive (e.g., attempt to modify or remove a predefined number greater than X), and yet another group may be less aggressive (e.g., attempt to modify or remove a predefined number less than X). Along these lines, one of the groups of predetermined rules may be a default group for performing the normalization. The default group of rules may be specified by users (e.g., users of user device 130 of FIG. 1 or those requesting their data be normalized).

Measurer 206 measures the quality of normalizer 204's normalization. For example, measurer 206 may determine the number of measurables. For example, measurer 206 may determine an original number of elements before or after normalization, a number of remaining elements of the code segments after normalization, a number of important elements in the code segments after normalization, a number of removed elements from the code segments after normalization, and/or a ratio of any of the aforementioned (e.g., a ratio of the number of removed elements from the code segments after normalization by the total number of elements in the code segments before normalization), to name a few examples.

Measurer 206 may determine if the measurables meet or exceed a predetermined threshold. Along these lines, the measurables may be associated with different thresholds. As such, measurer 206 may determine if a first measurable (e.g., a number of important elements in the code segments after normalization) and a second measurable (e.g., a number of removed elements from the code segments after normalization) meet or exceed different predetermined thresholds. If the measurables meet or exceed the respective predetermined threshold, measurer 206 may report a warning or error to user device 130 (of FIG. 1) and may automatically perform a less aggressive normalization (e.g., based on a less aggressive set of normalization rules). Once the measurables do not meet or exceed the predetermined threshold, the resulting ASTs may be compared. Further, the specific group of predetermined rules may be deemed sufficient. As a result, the group of predetermined rules may be automatically applied to future data, and measurer 206 may not need to measure the quality of normalizer 204's normalization.

Comparer 208 compares the ASTs after normalization and determines if they are the same. In doing so, comparer 208 compares corresponding nodes of the ASTs based on the unique identifier associated with the rule of the AST's nodes. For example, rules 1, 7, and 9 may be associated with a unique identifier and applied to the same nodes in respective ASTs. As such, comparer 208 may identify the nodes and compare their underlying data along with the unique identifiers associated with the rules.

In comparing, comparer 208 may utilize a text-based method or a tree-based method. The text-based method converts both ASTs to text-format code segments using the same code style (e.g., indentation). The tree-based method traverses each AST at the same or different times. For nodes at the same position in their respective AST, the tree-based method may compare based on whether they have the same lexical or syntactical attributes (e.g., symbols or literal values). In the process, the tree-based method may ignore unrelated attributes (e.g., code length and code start position).

Figure 6:
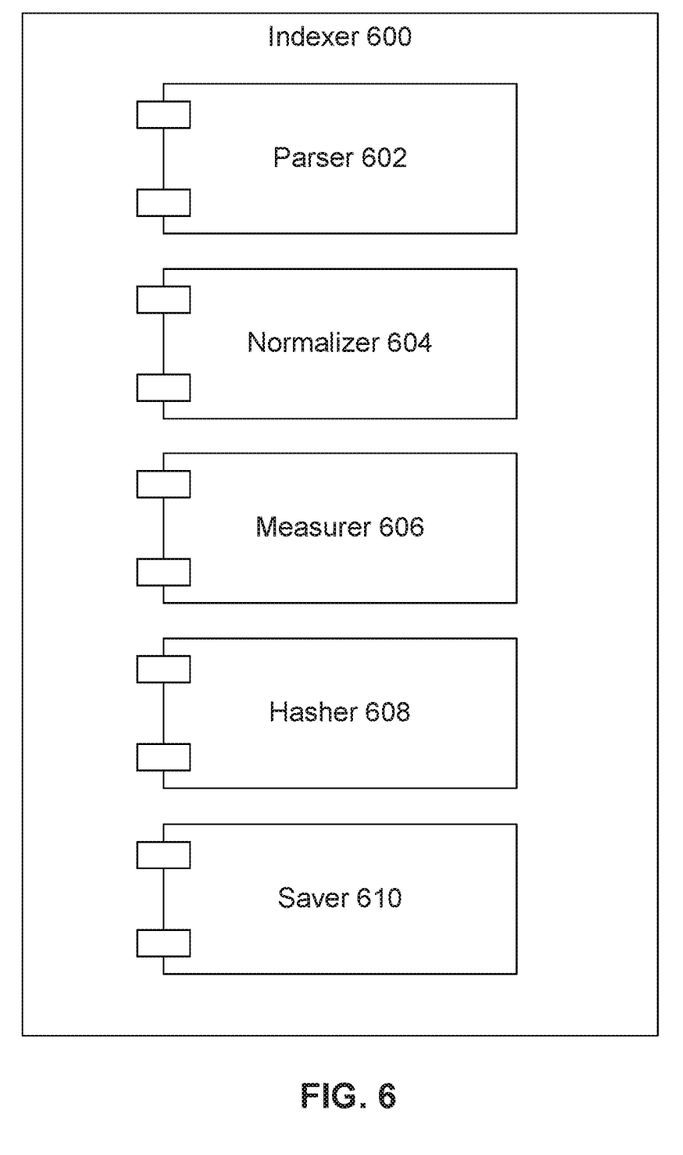
FIG. 6 is an example indexer of the system of FIG. 1, according to some embodiments.

FIG. 6 illustrates an example of indexer 600 for saving normalized data. Indexer 600 includes parser 602, normalizer 604, measurer 606, hasher 608, and saver 610. In some embodiments, indexer 600 may be built-upon the components/function of recognizer 200 (of FIG. 2). As such, indexer 600 may utilize the recognizer 200's parser 202, normalizer 204, and/or measurer 206 (of FIG. 2). Alternatively, indexer 600 may separately include parser 602, normalizer 604, and/or measurer 606.

Indexer 600 may also include hasher 608 and/or saver 610. Hasher 608 generates a hash code for the modified AST. As such, for original code segments of corresponding nodes of modified ASTs now having the same normalized AST or code segment, hasher 608 generates the same hash code for each of them. Further, hasher 608 may provide hash codes for code segments using a text-based method or a tree-based method. The text-based method converts each AST back to text-format code segments using the same code style (e.g., indentation) and then hashes each text (e.g., in Java using String.hashcode). The tree-based method converts each AST to a serialized document compact JavaScript Object Notation (JSON) formatted.

In some embodiments, hasher 608 may include rule data of the associated rule in the hashing of the node, for example, based on permission of a user of user device 130 (of FIG. 1). To do so, after generating a hash code for the normalized code segment, hasher 608 may generate a separate hash code for the associated rule data. Thereafter, hasher 608 may generate another hash code based on the hash codes of the normalized code segment and the associated rule data. Along these lines, a custom hash may be provided for a normalized code segment, the associated rule data, and/or the combination thereof, for example, by a user of user device 130 (of FIG. 1). Saver 610 saves the normalized code segment and the associated rule in an index (e.g., a hash-based index) of database 118 (of FIG. 1) based on the hash of the normalized code segment, associated rule, and/or combination thereof.

Figure 7:
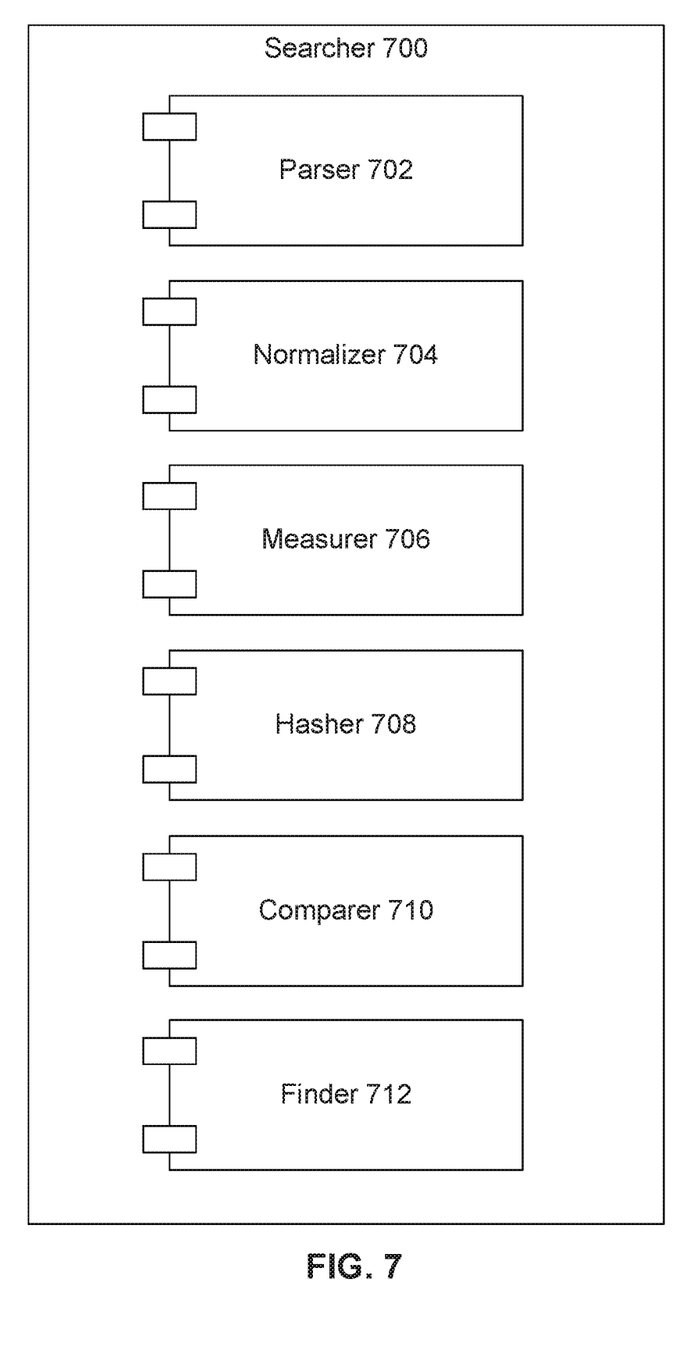
FIG. 7 is an example searcher of the system of FIG. 1, according to some embodiments.
Figure 8:
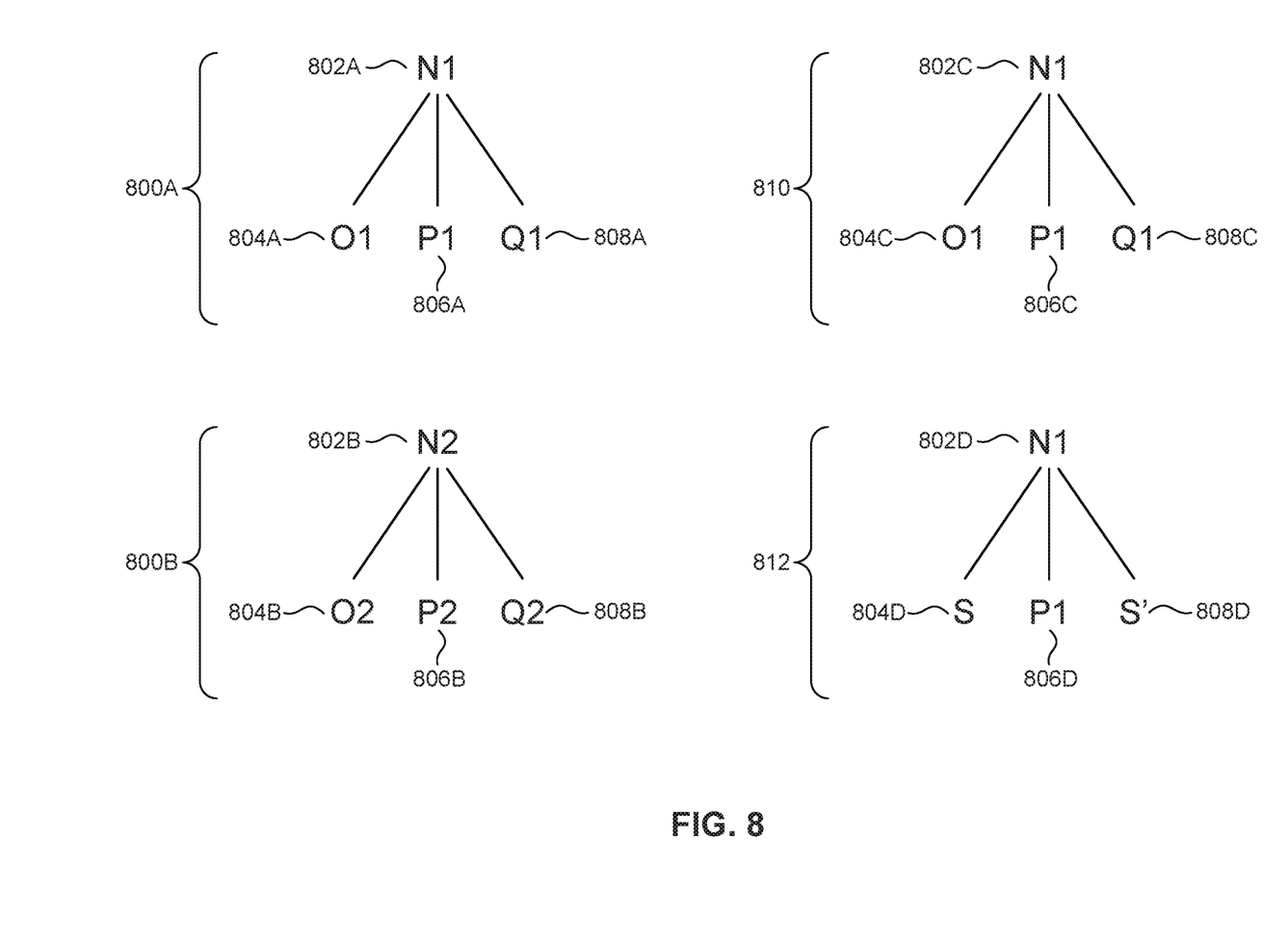

Referring back to FIG. 1, after analyzing device 104 processes hundreds/thousands (etc.) of code segments from programs 108A-B (of FIG. 1), particular index locations may have varying amounts of different code segments that are normalized to the same form. For example, one index location may have three different code segment normalized to a particular form, another index location may have fifteen different code segments normalized to a particular form, and yet another index location may have a single code segment normalized to a particular form. As such, the number of index locations is less than the number of code segments, thus providing storage cost savings, FIG. 7 illustrates an example of searcher 700 for identifying portions of normalized code segments. Searcher 700 includes parser 702, normalizer 704, measurer 706, hasher 708, comparer 710, and finder 712. In some embodiments, searcher 700 may be built-upon the components/function of recognizer 200 and/or indexer 400 (of FIGS. 2 and 4, respectively). As such, searcher 700 may utilize recognizer 200's or indexer's parser 202 and 602, normalizer 204 and 604, measurer 206 and 606, and comparer 208 and 608. Searcher 700 may also utilize indexer 600's hasher 608.

Searcher 700 may separately include parser 702, normalizer 704, measurer 706, hasher 708, and/or comparer 710. Searcher 700 also includes finder 712. Finder 412 may permit a user of user device 130 (of FIG. 1) to search and locate normalized data and/or associated rule data stored in database 120 (of FIG. 1).

Referring back to FIG. 1, after normalizing code segments of programs 108A-B and saving the normalized data into database 118, analyzer 116 may determine analytical information from the normalized data. In doing so, analyzer 116 may depend on searcher 700's finder 712 to go through the entire database 118 (e.g., index table 120 thereof). As such, analyzer 116 may be built on top of indexer 114.

Analyzer 116 may determine analytical information based on similar code segments being stored in different index locations in database 120's index table 122. For example, a particular index location may have four normalized code segments that were of four different original forms, and another particular index group may have one normalized code segment of a different original form. As such, analyzer 116 may determine analytical information by searching through index locations of database 120's index table 122.

For example, analyzer 116 may determine the number of normalized code segments in each index location. As noted above, a first index location may have four normalized code segments that were of forms different from each other and/or the normalized code segments, and a second index group may have one normalized code segment different from its original form. Accordingly, analyzer 116 may determine that the first index group has four normalized code segments and that the second index group has one normalize code segments.

Further, analyzer 116 may determine an average of normalized code segments/ASTs in each index location. Likewise, analyzer 116 may determine an overall distribution of normalized segments/ASTs in the index locations. Along these lines, as discussed above, nodes of normalized ASTs may correspond to different rules associated with different unique identifiers. Accordingly, analyzer 116 may also determine a number or distribution of corresponding nodes of different normalized ASTs based on the unique identifiers.

Now referring to analyzing device 106, as mentioned above, it reduces duplicate code. In doing so, analyzing device 106 may unify code patterns and/or styles. For example, code samples having particular styles may be:

```
//Code Sample 1
class ListNode {
  int value;
  ListNode next;
  String toString( )}
    return "ListNode<Int>("+value+")";
}
}
//Code Sample 2
class ListNode {
  String value;
  ListNode next;
  String toString( ) {
    return "ListNode<String>("
    +value
    +")";
  }
}
```

Accordingly, whereas the first code sample provides the "return" statement in one line, the second code sample provides the "return" statement in three lines. However, by normalizing, the resulting template will have one style. Another example is normalizing similar code to a dedicated pattern.

Analyzing device 106 comprises inducer 124, a modifier 126, and applier 128. Inducer 124 creates a template from two or similar code samples (e.g., portions of program code) by identifying common elements and separate different elements therefrom. Inducer 124 may first preprocess each code sample by converting it to an AST and then performing normalization of fragments on the nodes each AST. The normalization techniques may come from compilers, although other normalization techniques may be utilized (e.g., the normalization techniques provided by normalizer 204).

After preprocessing the code samples, inducer 124 may create an induced template AST based on any two code samples. Inducer 124 may update the induced template AST with each of the remaining code sample's AST. As such, inducer 124 may perform n−1 rounds of comparison to derive a final induced template AST, wherein "n" is equivalent to the number of code samples. For example, where there are 5 code samples (i.e., "A," "B," "C," "D," and "E"), inducer 124 may create an induced template AST "AST1" by comparing code samples "A" and "B." Inducer 124 may compare induced template "AST1" to code segment "C" and create an updated, induced template "AST2." Inducer 124 may thereafter compare "AST2" to code segment "D" and create an updated, induced template "AST3." Inducer 124 may lastly compare "AST3" to code segment "E" and create an updated, induced template "AST4," the final induced template.

During each round, inducer 124 determines if the underlying data of the corresponding AST nodes are type references. If the underlying data of the corresponding AST nodes are both type references, the inducer provides the special node "S" with an argument type (N1, N2), where "N1" and "N2" refer to a node of the first AST and the second AST, respectively. And, the inducer 124 continues to compare corresponding nodes of the ASTs and generate the new/updated AST template. However, if the underlying data of the corresponding nodes are different reference types, the inducer 124 performs a common ancestor lookup and determines if the underlying data of the corresponding share a common ancestor data type. Common ancestor lookup determines if the corresponding nodes share a common parent node. As such, the common ancestor lookup may utilize a bottom-up search or a fan-out search.

Accordingly, if the corresponding nodes share a common ancestor data type, inducer 124 provides a corresponding node of the AST template with the common ancestor type. Otherwise, if the corresponding nodes do not share a common ancestor data type, inducer 124 proves a corresponding node of the AST template with the special node "S" with a type-specific macro type (T1, T2), where "T1" and "T2" refer to a node of the first AST and the second AST, respectively. And, the inducer 124 stops comparing corresponding nodes of the ASTs and generating the new/updated AST template. Along these lines, inducer 124 may highlight any type-specific macros, for example, to remind a user of user device 130 to use better factory patterns (e.g., factory methods and dependency injection).

In the processing of the AST template, inducer 124 may derive multiple argument tuples, where some argument tuples may occur repeatedly. Accordingly, inducer 124 determines a number of times unique argument tuples occur and sorts the argument tuples based on the number of times that they occurred. Inducer 124 may then select the argument tuple occurring the most number of times and convert the particular argument tuple to a generic parameter (e.g., T1).

In some embodiments, inducer 124 may determine if the number of unique argument tuples meets or exceeds a predetermined threshold of unique tuples. For example, if argument tuple (N1, N2) occurs twice, argument tuple (N3, N4) occurs twice, and argument tuple (N5, N6) occurs once, inducer 124 may determine that there are 3 unique argument tuples—i.e., (N1, N2), (N3, N4) and (N5, N6) and that this amount of unique argument tuples exceeds the predetermined threshold of unique tuples (i.e., 2). Inducer 124 may then stop inducing and select the unique argument tuples having the most occurrences (e.g., (N1, N2) and (N3, N4)). This may avoid having too many generic parameters. Inducer 124 then stores the templates, for example, to disk.

Modifier 126 may modify an induced AST template, for example, to improve its quality. In some embodiments, generic parameters and/or type-specific macros of the induced AST template may be renamed, although other types of parameters may also be renamed. As such, if a reference of a particular generic parameter or type-specific macro is renamed, then references to the particular generic parameter or the type-specific macro in the AST template are renamed accordingly. For example, where the generic parameter "T" is renamed "Element," then references to the generic parameter "T" are automatically renamed throughout the AST template. The modification of the induced AST template may be by a user at user device 128.

Applier 128 may receive a selection of a generated AST template and new type arguments from users to generate new code. For example, a template "ListNode<T>" is induced from a node sample written with "int" type and a node sample written with a "string" type. The template contains a two branch type-specific macro, with the first branch for the "int" type and the second branch for the "string" type. As such, applier 128 may permit a user to receive a new code for a "cat" type argument. Specifically, applier 128 may generate a new code segment by specifying the template and passing in the "cat" type argument. In doing so, although not necessary, applier 128 may have custom logic to add a branch to the template for the "cat" type argument.

In some embodiments, applier 128 may utilize a C++ template syntax or a similar template syntax thereto. For example, where the programming language is C++, the induced AST template follows the C++ built-in syntax, which converts type-specific macros to C++ type traits such that they can be used directly. In other programming languages (e.g., Java), applier 128 utilizes a similar syntax to C++ created by a simple code generator, which receives the induced template and actual argument values. The simple code generator then replaces the generic parameter with actual argument values and select suitable type-specific macros based on the actual argument values.

Figure 9:
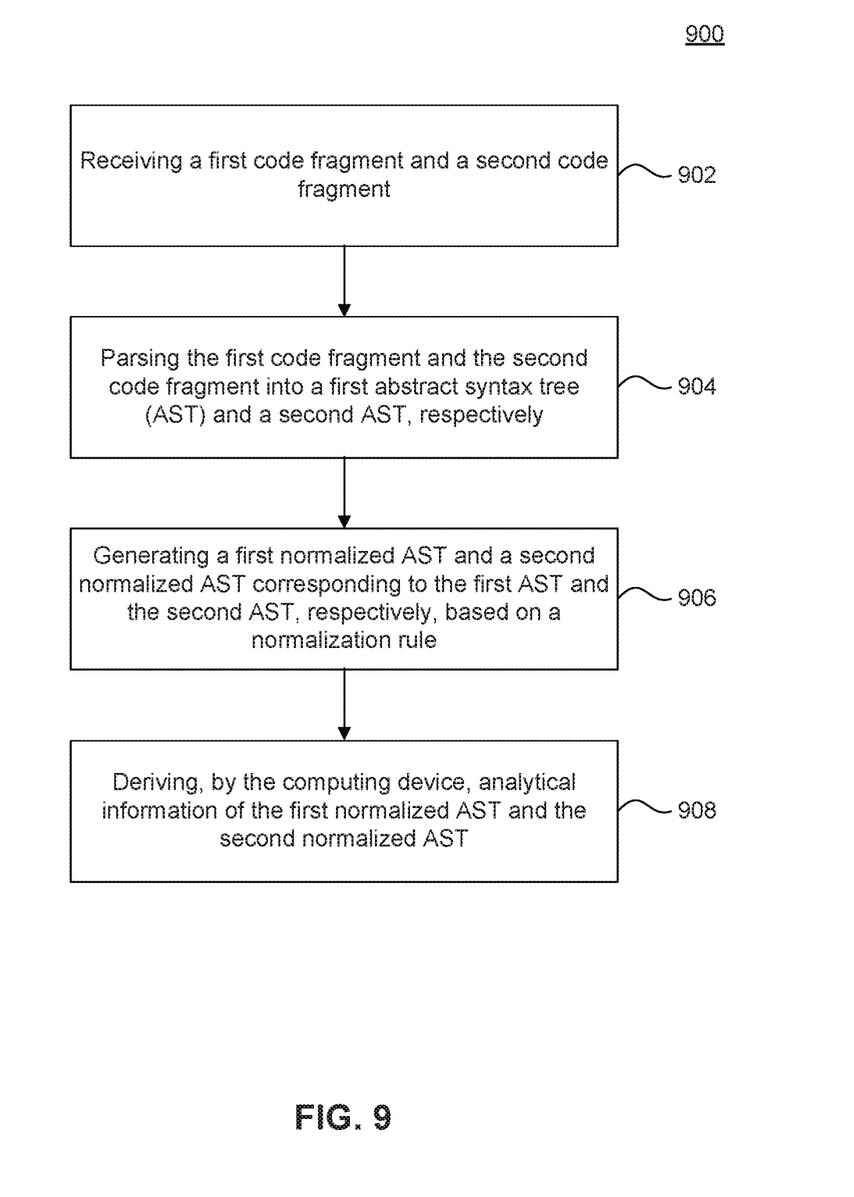
FIGS. 9 and 10 are flowcharts illustrating example processes for mitigating duplicate data, according to some embodiments.
Figure 10:
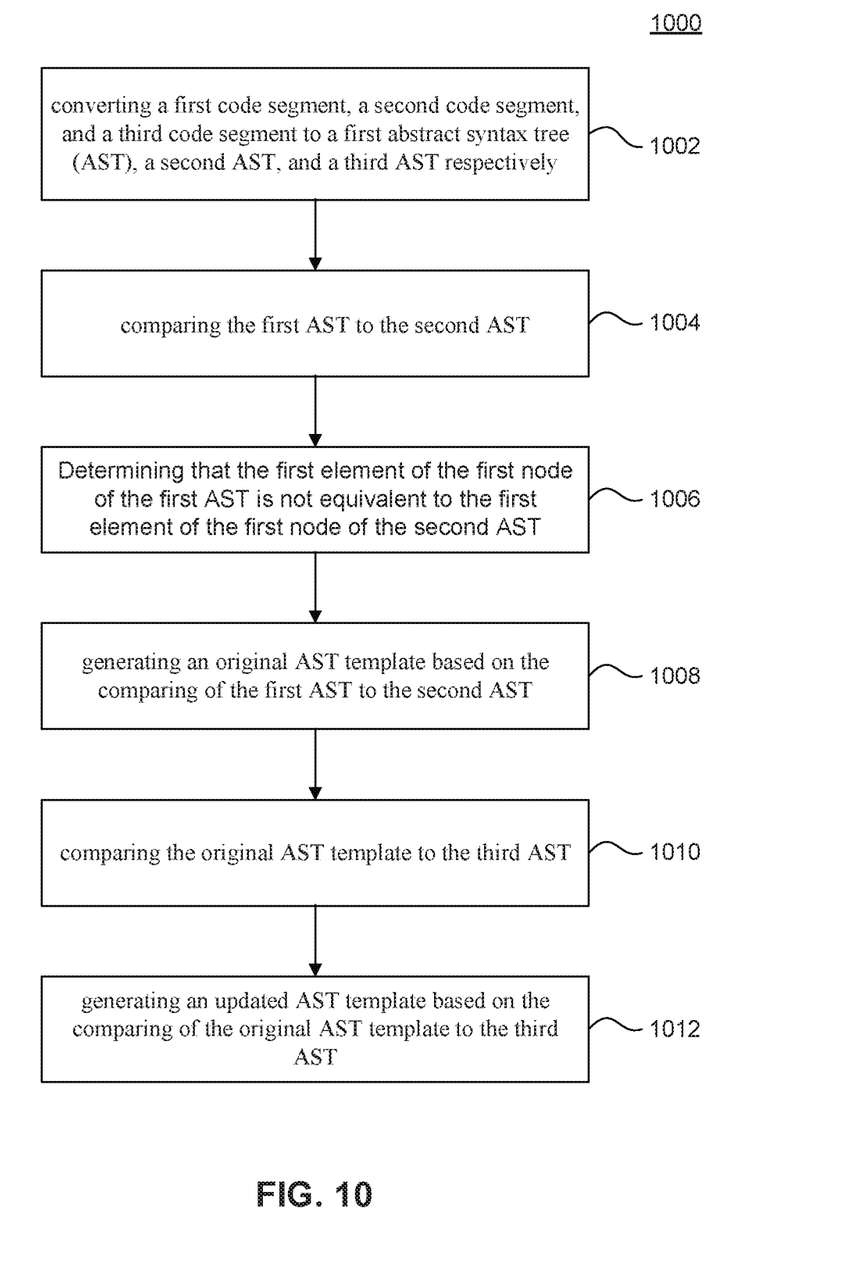

FIG. 9 is a flowchart for a method 900 for normalizing similar code segments, according to some embodiments. FIG. 10 is a flowchart for method 1000 for mitigating duplicate data, according to some embodiments. Methods 900 and 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIGS. 9 and 10, as will be understood by a person of ordinary skill in the art.

Method 900 shall be described with reference to FIG. 1. However, method 900 is not limited to that example embodiment.

In 902, analyzing device 104 receives a first code segment and a second code segment. The first code segment is different from the second code segment. In some embodiments, the first and second code segments are of the same programming language. Alternatively, the first and second code segments are of different programming languages.

In 904, analyzing device 104 parses the first code segment and the second code segment into a first abstract syntax tree (AST) and a second AST, respectively. Since the first code segment and the second code segment are different, at least one node of the first AST is different than the corresponding node of the second AST. Along these lines, each node of the first and second ASTs includes a portion an element) of the code segment.

In 906, analyzing device 104 generates a first normalized AST and a second normalized AST corresponding to the first AST and the second AST, respectively, based on a normalization rule. In some embodiments, the normalization rule may be a group of normalization rules. As such, each rule of the group of normalization rules is associated with a unique identifier, and the whole group corresponds to the first and second ASTs. For example, the group of rules comprises two different rules corresponding to different unique identifiers. Accordingly, after the normalization, the first normalized AST mirrors the second normalized AST. The first and second normalized ASTs correspond to a first and second normalized code segment, respectively.

In 908, analyzing device 104 derives analytical information based on the first and second normalized code segments.

Referring now to FIG. 10, method 1000 shall be described with reference to FIG. 1. However, method 1000 is not limited to that example embodiment.

In 1002, analyzing device 106 converts a first code segment, a second code segment, and a third code segment to a first abstract syntax tree (AST), a second AST, and a third AST, respectively. The first code segment is different from the second code segment. In some embodiments, the first and second code segments are of the same programming language. Alternatively, the first and second code segments are of different programming languages.

In 1004, analyzing device 106 compares the first AST to the second AST. In doing so, analyzing 106 compares corresponding nodes of the first AST and the second AST. This may be performed by traversing the first and second ASTs at the same or different times. In some embodiments, the original AST and/or third. AST may not have one or more corresponding nodes.

In 1006, analyzing device 106 generates an original AST template based on the comparing of the first AST to the second AST. In doing so, analyzing device 106 may copy data when the corresponding nodes match and may provide generic parameters for nodes that do not match. Likewise, if the first AST or second AST does not have a corresponding node, a generic parameter may be provided for the particular node.

In 1008, analyzing device 106 compares the original AST template to the third AST. In doing so, the analyzing device 106 compares corresponding nodes of the original AST nodes and the third AST. This may be performed by traversing the first and second ASTs at the same or different times. In some embodiments, the original AST and/or third AST may not have one or more corresponding nodes.

In 1010, analyzing device 106 generates an updated AST template based on the comparison of the original AST template to the third AST. In doing so, analyzing device 106 may copy data when the corresponding nodes match and may provide generic parameters for nodes that do not match. Likewise, if the original AST template or third AST does not have a corresponding node, a generic parameter may be provided for the particular node.

Figure 11:
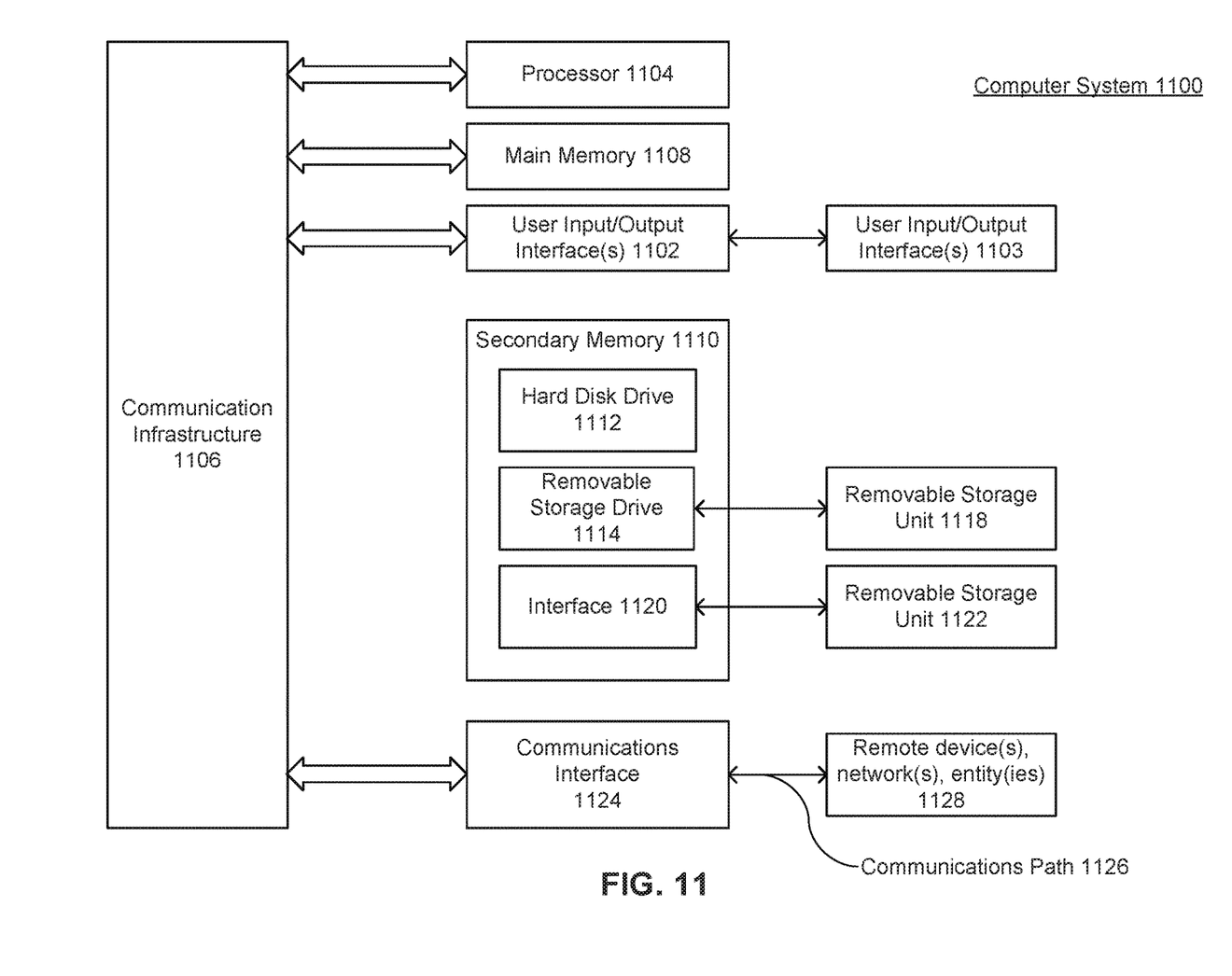
FIG. 11 is an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer-usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities, or other approaches for allowing computer programs and/or other instructions and/or data to be accessed by computer system 1100. Such means, devices, components, instrumentalities, or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for mitigating similar code segments, comprising:
   receiving, by a computing device, a first code segment and a second code segment, wherein the first code segment is different from the second code segment;
   parsing, by the computing device, the first code segment and the second code segment into a first abstract syntax tree (AST) and a second AST, respectively;
   generating, by the computing device, a first normalized AST and a second normalized AST corresponding to the first AST and the second AST, respectively, based on a first normalization rule such that the first normalized AST and the second normalized AST correspond to a first normalized code segment and a second normalized code segment, respectively, wherein the first normalized code segment mirrors the second normalized code segment; and
   deriving, by the computing device, analytical information of the first normalized AST and the second normalized AST based on the first normalized code segment and the second normalized code segment.

2. The computer-implemented method of claim 1, wherein the first code segment and the second code segment are from a computer application.

3. The computer-implemented method of claim 1, wherein the first code segment and the second code segment are from a first computer application and a second computer application, respectively.

4. The computer-implemented method of claim 1, wherein each of the first code segment and the second code segment comprises a first element and a second element, and wherein each of the first AST and the second AST comprises a first node and a second node representing the first element and the second element, respectively.

5. The computer-implemented method of claim 4, the generating of the first normalized AST and the second normalized AST comprising:
   applying, by the computing device, the first normalization rule to the first node of the first AST and the second AST to generate a first normalized node of the first normalized AST and of the second normalized AST; and
   applying, by the computing device, a second normalization rule to the second node of the first AST and the second AST to generate a second normalized rule of the first normalized AT and of the second normalized AST.

6. The computer-implemented method of claim 5, wherein the first and second normalization rules are customized to a database comprising the first and second code segments.

7. The computer-implemented method of claim 5, the applying of the first normalization rule or the second normalization rule comprising:
   removing or modifying an element of the first node or the second node of the first AST or the second AST.

8. The computer-implemented method of claim 5, further comprising:
   determining, by the computing device, that the first normalized AST and the second normalized AST meet or exceed a predetermined quality level relating to a number of normalized elements of the first node or the second node,
   wherein the deriving of the analytical information is based on the first normalized AST and the second normalized AST meeting or exceeding the predetermined quality level.

9. The computer-implemented method of claim 8, further comprising:
- determining, by the computing device, that at least one of the first normalized AST and the second normalized AST falls below a predetermined quality level relating to a number of normalized elements of the first node or the second node, respectively;
- generating, by the computing device, a third normalized AST and a fourth normalized AST corresponding to the first AST and the second AST, respectively, based on the second normalization rule such that the third normalized AST mirrors the fourth normalized AST, wherein the third normalized AST and the fourth normalized AST are different from the first normalized AST and the second normalized AST, respectively, and wherein the second normalization rule is different than the first normalization rule; and
- determining, by the computing device, that the third normalized AST and the fourth normalized AST meet or exceed a predetermined quality level,
- wherein the analytical information is of the third normalized AST and the fourth normalized AST.

10. The computer-implemented method of claim 1, further comprising:
- generating, by the computing device, a hash code for the first normalized AST and the second normalized AST based on the first normalized code segment and the second normalized code segment, respectively, such that the hash code for the first normalized AST is the same as the hash code for the second normalized AST; and
- saving, by the computing device, the first normalized code segment and the second normalized code segment in a single location of an index based on the hash code,
- wherein the deriving of the analytical information is after the saving of the first normalized code segment and the second normalized code segment.

11. The computer-implemented method of claim 10, further comprising:
- finding, by the computing device, the first normalized code segment and the second normalized code segment in the single location of the index based on the first hash code,
- wherein the deriving of the analytical information is after the finding of the first normalized code segment and the second normalized code segment.

12. The computer-implemented method of claim 1, further comprising:
- comparing, by the computing device, the first normalized AST to the second normalized AST; and
- determining, by the computing device, that the first normalized AST mirrors the second normalized AST.

13. The computer-implemented of claim 12, the comparing comprising:
- converting, by the computing device, the first normalized AST and the second normalized AST to a first modified code segment and a second modified code segment, respectively; and
- comparing one or more characters of the first code segment to one or more characters of the second modified code segment; and
- determining, by the computing device, that the one or more characters of the first code segment mirror the one or more characters of the second code segment.

14. The computer-implemented method of claim 1, further comprising:

- receiving, by the computing device, a third code segment different from the first code segment and the second code segment;
- parsing, by the computing device, the third code segment into a third AST;
- generating, by the computing device, a third normalized AST corresponding to the third AST based on a second normalization rule such that the third normalized AST comprises a third normalized code segment different from the first normalized code segment and the second normalized code segment;
- saving, by the computing device, the first normalized code segment and the second normalized code segment in a first index location of a database;
- saving, by the computing device, the third normalized code segment in a second index location of the database, wherein the second index location is different from the first index location; and
- deriving, by the computing device, analytical information of the third normalized AST based on the third normalized code segment.

15. A non-transitory computer-readable device having instructions stored thereon that, when executed by at least one computing device, causes the at least one computing device to perform operations comprising:
- receiving a first code segment and a second code segment, wherein the first code segment is different from the second code segment;
- parsing the first code segment and the second code segment into a first abstract syntax tree (AST) and a second AST, respectively;
- generating a first normalized AST and a second normalized AST corresponding to the first AST and the second AST, respectively, based on a normalization rule such that the first normalized AST and the second normalized AST corresponds to a first normalized code segment and a second normalized code segment, respectively, wherein the first normalized code segment mirrors the second normalized code segment; and
- deriving, by the computing device, analytical information of the first normalized AST and the second normalized AST based on the first normalized code segment and the second normalized code segment.

16. A computer-implemented method for mitigating duplicate data, comprising:
- converting, by a computing device, a first code segment, a second code segment, and a third code segment to a first abstract syntax tree (AST), a second AST, and a third AST respectively;
- comparing, by the computing device, the first AST to the second AST;
- generating, by the computing device, an original AST template based on the comparing of the first AST to the second AST;
- comparing, by the computing device, the original AST template to the third AST; and
- generating, by the computing device, an updated AST template based on the comparing of the original AST template to the third AST.

17. The computer-implemented method of claim 16, the generating of the original AST template and the updated AST template comprising:
- determining, by the computing device, that a first node of first AST mirrors a corresponding first node of the second AST; and
- producing, by the computing device, a first node for the original AST template that mirrors the first node of the first AST and the second AST based on the first node of the first AST mirroring the first node of the second AST;

determining, by the computing device, that the first node of the original AST template mirrors a corresponding first node of the third AST; and producing, by the computing device, a first node of the updated AST template that mirrors the first node of the original AST template and the third AST based on the first node of the original AST template mirroring the first node of the third AST.

18. The computer-implemented method of claim 17, wherein the first code segment is different from the second code segment or the third code segment, wherein the first AST, the second AST, and the third AST comprise a plurality of nodes, and wherein at least one node of the first AST is different from at least one node of the second AST or the third AST.

19. The computer-implemented method of claim 18, the generating of the original AST template and the updated AST template comprising:

determining, by the computing device, that a second node of the first AST does not mirror a corresponding second node of the second AST; and assigning, by the computing device, a generic parameter for a second node of the original AST template corresponding to the second node of the first AST and the second AST based on the first node of the first AST not mirroring the second node of the second AST.

20. The computer-implemented method of claim 18, the generating of the original AST template and the updated AST template comprising:

determining, by the computing device, that a second node of the first AST does not mirror a corresponding second node of the second AST;

identifying, by the computing device, that an ancestral node of the second node of the first AST mirrors an ancestral node of the second node of the second AST;

producing, by the computing device, a second node for the original AST template that mirrors the ancestral node of the second node of the first AST and the second AST based on the identifying;

determining, by the computing device, that a second node of the third AST or an ancestral node corresponding to the second node of the third AST mirrors the second node of the original AST template; and producing, by the computing device, a second node for the updated AST template that mirrors the second node or the ancestral node of the second node of the original AST template and the third AST based on the second node or ancestral node of the third AST mirroring the second node of the original AST template.

* * * * *